FLAG STORAGE SYSTEM

Filed March 9, 1964 3 Sheets-Sheet 1

INVENTORS:
Howard L. Stahle
Irwin L. Furman

By [signature]
Attorney

June 20, 1967 I. L. FURMAN ET AL 3,327,294

FLAG STORAGE SYSTEM

Filed March 9, 1964 3 Sheets-Sheet 2

INVENTORS
Howard L. Stahle
Irwin L. Furman
By [signature]
Attorney

June 20, 1967 I. L. FURMAN ET AL 3,327,294
FLAG STORAGE SYSTEM
Filed March 9, 1964 3 Sheets-Sheet 3
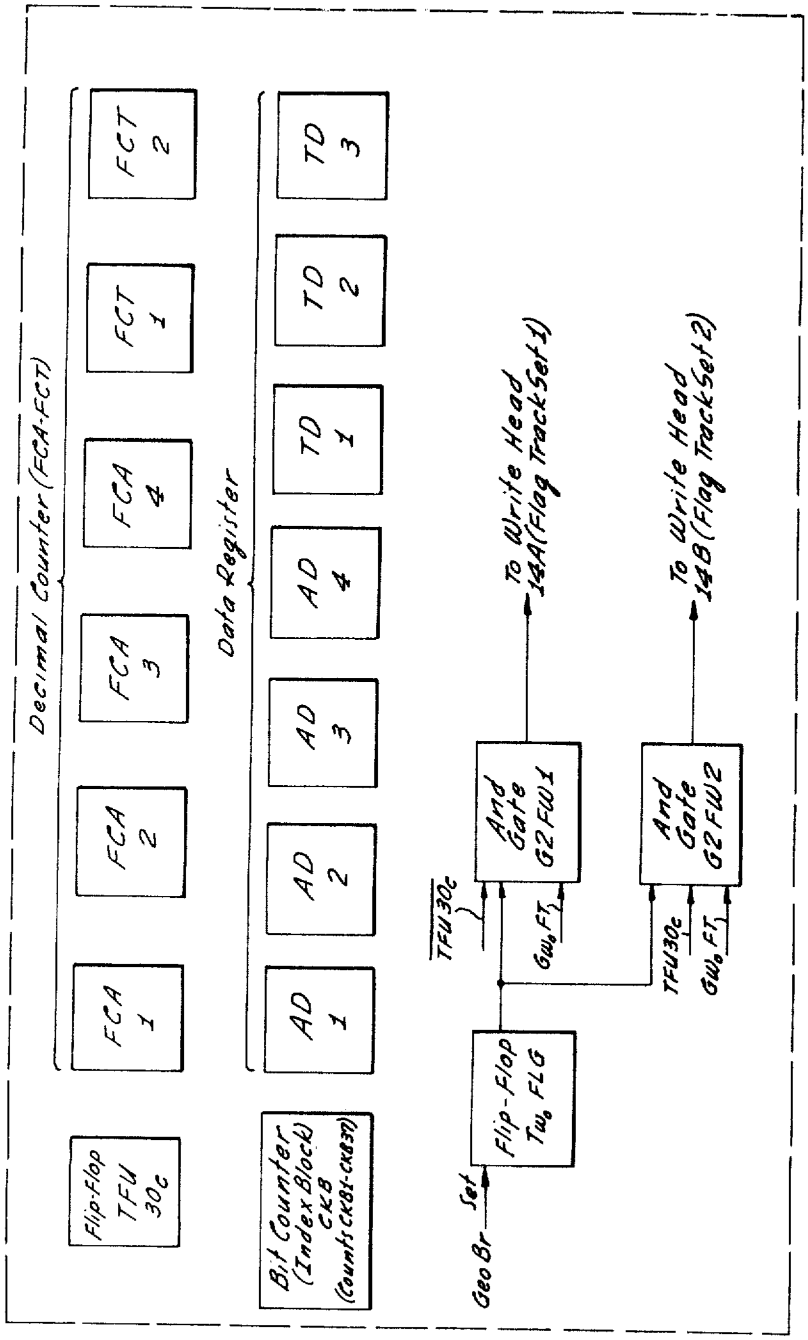
Fig. 7 Logic-Obsolete-Flags
INVENTORS
Howard L. Stahle
Irwin L. Furman
By [signature]
Attorney 3,327,294

FLAG STORAGE SYSTEM

Irwin L. Furman, Los Angeles, and Howard L. Stahle, Tujunga, Calif., assignors to General Precision, Inc., a corporation of Delaware Filed Mar. 9, 1964, Ser. No. 350,239
7 Claims. (Cl. 340—172.5)

The present invention relates to memory systems for use with electronic data processing equipment; and it relates more particularly to an improved data mass storage system which may be of the content addressable type.

The embodiment of the invention to be described is generally similar to the mass storage system described in copending application Ser. No. 329,437 filed Dec. 10, 1963, in the name of Paul R. Hickey and assigned to the present assignee.

The mass memory, or storage system of the present invention, in the embodiment to be described, like the system of the copending application, is capable of storing a relatively large amount of binary coded digital data. The content addressable feature of the particular embodiment, as was the case in the system of the copending application, permits desired data to be derived from the system by addressing the data itself, instead of addressing a particular location in the memory at which the data is stored. This feature permits any particular block of data to be stored at random in the memory system at any available memory location which may be encountered during a write phase of the system.

The particular memory system described in the aforesaid copending application utilizes one or more rotatable magnetic memory discs as the storage medium; the discs being mounted on a common drive shaft. A serial/parallel type of access to the magnetic memory disc is used in the system of the copending application. The embodiment to be described herein also may utilize rotatable magnetic memory discs with serial/parallel type access. It will become evident as the description proceeds, however, that other equivalent systems and apparatus may be used.

The improved memory system of the invention, like the system disclosed in the copending application, is conceived and constructed, as will be described, in an improved manner such that the associated data processing equipment is relieved of many bookkeeping tasks. Such tasks include, for example, flagging areas within the memory which are available to receive and store data, and other like operations, these being performed by the memory system itself instead of by the data processing equipment.

As mentioned above, since the content addressable technique permits desired data to be selected from memory on the basis of its own key, rather than by a fixed address within the memory, the different data blocks stored in the memory need not have any particular location therein. Therefore, the improved flagging system of the present invention provides that when a block of data is selected from the memory, its previous location may be flagged as "available" for the storage of other blocks. The selected block of data can then be rewritten into the memory (for example, after updating), at the first flagged area, or memory location, to present itself during the subsequent write phase.

Three types of flags will be described herein. The first is the "obsolete" flag (O). Whenever these O flags appear in one or more special flag track sets which are provided on the memory disc, they indicate that particular locations in the memory are available to receive new data.

The second type of flag is the "missed record" flag (M). The function of this latter flag M is to indicate which key or index portions of successive data blocks were missed for a particular pass during a key search phase. Such flagging is necessary in the embodiment to be described because, when key agreement is made on the index portion of a particular block, the key search of the system switches to a corresponding data track on the memory disc which is different from the track in which the successive key or index portions appear. This means that the index portions of other data blocks, which appear in the common index track set on the memory disc, as described in the copending application, may be missed during the initial pass. The system to be described provides for the missed index portions to be designated by "missed record" flags. This means that any records marked as "missed" by corresponding flags in the flag track set on the memory disc during the initial key search may be checked on subsequent revolutions of the magnetic memory disc.

The system to be described also provides for certain index portions encountered during a key search to be marked with a "compare" flag. This flag is used, for example, to keep track of data blocks which compare fully with the key criteria established by the associated data processor, but which have not been selected by the data processor. The latter data blocks may be picked up later by the computer, merely upon encountering "compare" flag indicators in the flag track set, and with no need to repeat the key search.

Certain difficulties are encountered, however, when it is desired to indicate data block locations with a "compare" or "obsolete" flag if superfluous memory disc rotational movements are to be avoided. These difficulties arise in that the "obsolete" and "compare" flags should be written in the flag track set immediately in a position so as to indicate that next succeeding data block has compared favorably during a preceding key search, or that the next succeeding data block is obsolete and that the location is available to receive a new block of data. However, the conditions for writing a "compare" or an "obsolete" flag in the flag band are not known until the entire data block has been read. This problem does not apply to "missed" flags, since they are written at the beginning of each index interval and are read on succeeding disc revolutions, during that same index interval It is an object of the present invention to provide an improved mass memory system of the type described above, and one which is capable of providing the aforesaid flag indications in a simple and expeditious manner.

Another object of the invention is to provide such an improved system by which the aforesaid flag indications are generated with a minimum of equipment and by the use of relatively simple logic circuitry.

A feature of the invention in the embodiment to be described is the provision of a circulating register for the aforesaid flags which includes the flag track sets on the memory disc in the embodiment to be described. This register includes two track sets each having a pair of annular tracks on the memory disc in the embodiment to be described. These tracks of each of the above-mentioned flag track sets will be designated herein as the long and short delay flag tracks, respectively. The register also includes inter-connecting logic circuitry which permits circulation from the short delay flag track back to the long delay flag track.

The aforementioned logic circuitry is activated only during intervals during which a condition to be flagged arises, so that the flag indications from the short flag track are written into the long flag track only during such intervals, in order to preserve a high degree of accuracy and precision in the system. That is, flag data is permanently stored on the long flag track of each set, and this data is altered only when the write circuitry associated with the long delay track is activated. When the aforesaid long track circuitry is activated, compare and obsolete flag data from the associated logic circuitry may be written into the long flag track. In addition the data in the long flag track of each set is continuously and non-destructively circulated into the corresponding short flag track, and this data may be recirculated back into the long flag track, when it is desired to alter one or more of the flags. The short flag track, as will be described, is used for the circulation of obsolete flags for bands that have not been selected by the data processor and for the writing of missed flags at the front of a data block.

Duplicate tracks may be provided for error checking purposes. As the flag data is being read from the long delay track, it is checked with data in the duplicate track. An error is indicated if a flag pertinent to the operation being performed does not compare with its duplicate.

Other features and advantages of the invention will become apparent from a consideration of the following description, when the description is taken in conjunction with the accompanying drawings, in which:

FIGURE 7 is a block diagram showing the above-mentioned logic in more detail.

Figures 1, 2, 3:
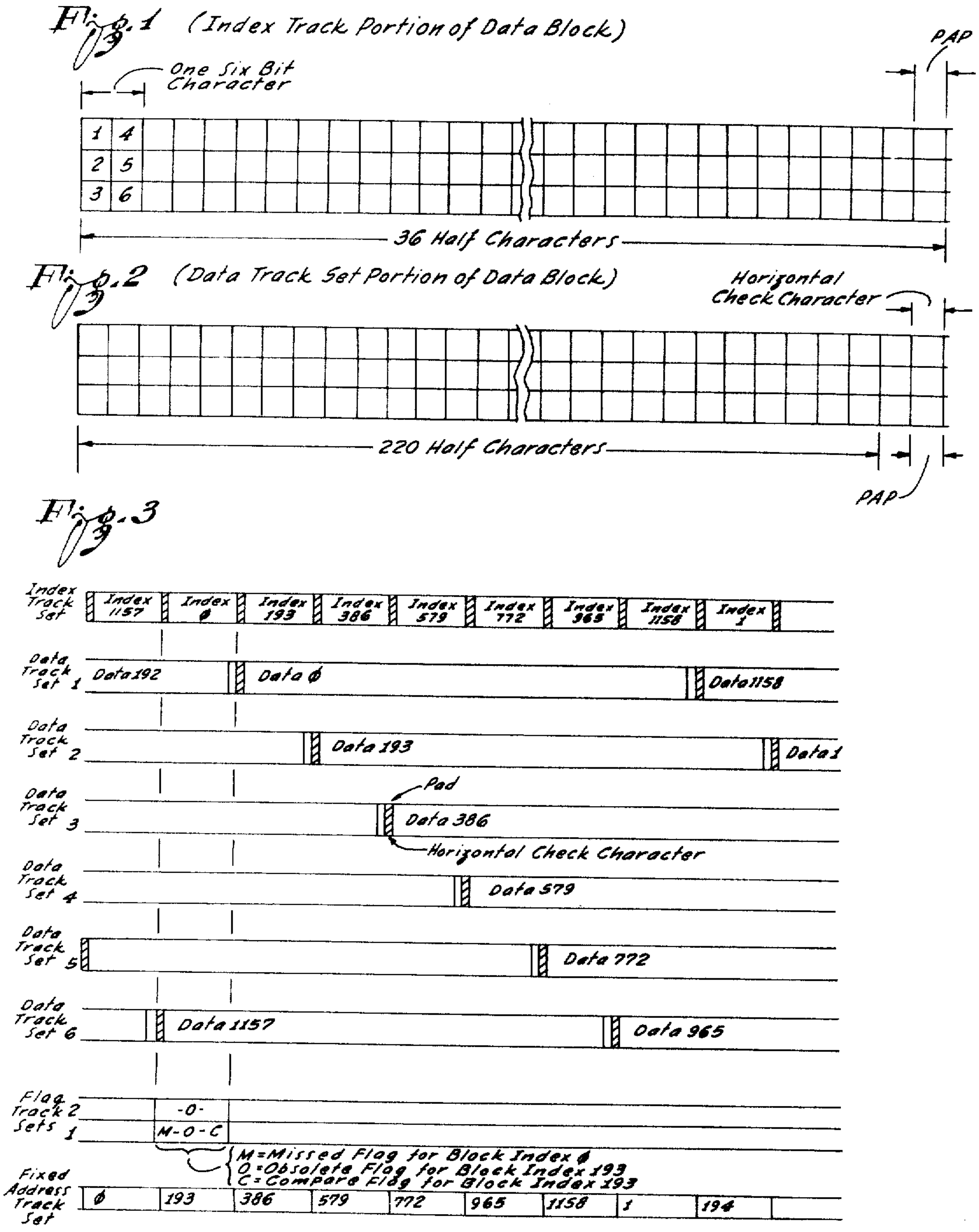
FIGURE 1 is a schematic representation of the index portion of each data block stored in the mass memory to be described.
FIGURE 2 is a schematic representation of a data block minus the index portion stored in the mass memory to be described.
FIGURE 3 is a fragmentary, schematic representation of a magnetic memory disc, and of the manner in which information is stored on the disc in accordance with the concepts of the aforementioned copending application, and in the mass memory to be described.

As described in detail in the copending application, the method of recording utilized in the mass memory to be described is of the parallel/serial type. Each block of data, and its corresponding index portion, is shown to be composed of a plurality of six bit characters, as shown in FIGURES 1 and 2. These six bit characters are serially recorded in parallel half character groups of three bits each, as shown. Each block of data is identified by its index portion, as shown in FIGURE 1. This index comprises, for example, thirty-six half characters and it is used to enable a fast access rate in accordance with the content identification techniques described in the copending application.

As shown in FIGURE 1, each index is composed of 36 half characters, each having three parallel bits. The thirty-seventh half character is a pad half-character. As will be described, the indices are recorded separately on a common index track set, and the pad half characters serve to separate the indices.

As mentioned above, the data portion (FIGURE 2) corresponding to each index (FIGURE 1) is also recorded in a serial/parallel manner. The data portion is composed, for example, of 220 three-bit half characters. In each instance, and in order to preserve recording space, the seventh or parity bit of each alphanumeric character is stripped off, and these are replaced by a single three-bit horizontal check character, or "hash-total," such as shown in FIGURE 2. Each data portion is likewise terminated by a pad half-character.

To achieve the feature of fast slew rate and a slower data transfer rate, as described in the copending application, the data blocks are written into the memory disc across two or more sets of selectable data tracks, as shown in FIGURE 3. This is different from the usual prior art recording process in which an entire data block, together with its index portion, is written into a selected track in the memory medium.

Instead of the usual prior art practice, and in accordance with the concepts described in the copending application, the index portion (FIGURE 1) of a particular data block is written into the index track set of FIGURE 3. This track set, in the illustrated embodiment, includes three tracks, so that the three-bit half characters of FIGURE 1 may be written into the track set in parallel across the three tracks, and serially along the track set as the memory disc rotates.

The data blocks of FIGURE 2 are written into the memory disc in individual three-track data track sets, as shown in FIGURE 3, and in an interlaced manner. In the representation of FIGURE 3, for example, six three-track data track sets are shown. The six data track sets and corresponding index track set are considered to form a "band" or "file." A maximum of seven revolutions is required to process one data band. A constructed embodiment of the invention includes 60 such bands, and these are identified by a single flag track set.

It will be appreciated that the index portions of each data block in a particular band or file are recorded successively in the index track set of FIGURE 3. During the writing mode of operation, the first 18 characters of each data block, corresponding to the index portion of FIGURE 1, are written into the index track set. Then, appropriate logic switching provides for recording the remaining 110 characters of the data block (FIGURE 2), in one of the six data track sets in the particular band, as shown in FIGURE 3. The writing operation is repeated in subsequent rotations of the memory disc for the other bands.

The writing operation for any particular band proceeds, for example, from record 0 to record 1 in the illustrated embodiment. The index portion of record 0 is written in the index track set, and the data portion of that record is written without interruption in the data track set 1, as shown.

Following the writing of the data block 0, the data block 1 is then written into the same memory band. This latter writing process commences with the recording of the index portion of the data block 1 in the index track set of that band; and this is followed by the recording of the data block 1 in data track set 2 of that band. Following a complete revolution of the memory disc, the second set of data blocks are written in an interlaced manner, starting at the index portion 193 and continuing on to the index portion 385. Then, in a further interlaced manner, the blocks 386–578 are recorded, and so on.

In the above described manner, the complete band of data blocks can be recorded in the index track set and in the six data track sets of that band, as illustrated in FIGURE 3, and in an interlaced manner. This can be achieved upon seven revolutions of the memory disc.

The net result of the format on the magnetic disc, as shown in FIGURE 3, is that in one revolution of the disc, it is possible by reading only the index track set of a selected band, to examine the first eighteen characters of all the data blocks stored in the six data track sets of that band.

During the aforementioned reading of the index track set of FIGURE 3, the various index portions successively read from the index track set are compared in a usual compare network with the criteria established by the associated data processor. That is, the associated data processing equipment establishes in a search register the content criteria of a desired block of data. Then, the index portions from the index track set are successively read into the compare network with the data from the search register until a "compare" condition is achieved. If no "compare" condition is achieved the search is continued into the next band, and so on.

When the "compare" condition occurs, the logical switching of the logic circuitry causes the reading from the mass memory to be switched from the index portion which produces the "compare" condition to the corresponding data track set, so that the remaining characters of the particular data block may be examined for content suitability. Any time the "compare" criteria is not met, the reading is switched back from the data set to the index.

During the interval described above, when the search is switched from an index track set to the data in the corresponding data track set, the subsequent index portions in the particular index track set are not read. These subsequent index portions, therefore, are missed. In accordance with the system of the present invention, thesee missed index portions are marked or "flagged" by flag signals in the flag track set on the memory disc. In this manner, the missed index portions may be checked on a subsequent revolution of the memory disc, so that the search may be complete in every detail.

It will be appreciated that for a content addressable serial memory, such as described above, to be really effective, the system must permit data to be recalled from the magnetic memory disc for updating purposes. This is achieved, as described briefly above, by means of a successful comparison between an entire data block read in one of the bands of the disc memory and the specified criteria held in a search register and supplied by the associated data processing equipment. It also follows, that for the system to be readily effective, it should be possible to write the selected data block in any available memory location in the data track sets of the different bands, and in the first available location to be reached during a subsequent writing operation.

That is, for the memory system of the invention to be really effective, it must be constructed so that the data need not be stored in the same memory location on the memory disc after it has been selected and updated, but in the first available location encountered during the subsequent write phase. When this is achieved, the programmer never needs any cognizance of a specific block address. The latter requirement is met in the system of the invention by marking the memory in such a manner that when a data block is read from the memory for updating, or other purposes, the location in the data band from which it was read is marked by a corresponding flag indication in the flag tracks, so as to indicate that the particular memory location is obsolete and available for the storing of a new data block.

However, as noted above, problems arise in providing for the appropriate flag marking of the locations in the data bands from which data has been read, and which are available to receive new data. For example, on a normal content search, the last character of a block of data read from the memory disc must be checked before it can be established that the block meets all the search requirements. It is then too late to mark the memory location from which the record was derived as obsolete and available for a subsequent block. On the other hand, when a random write operation is being carried out, it is necessary to know prior to the first character of the block to be written into the memory, whether any particular area on the memory is obsolete and available to receive the new block.

Figure 6:
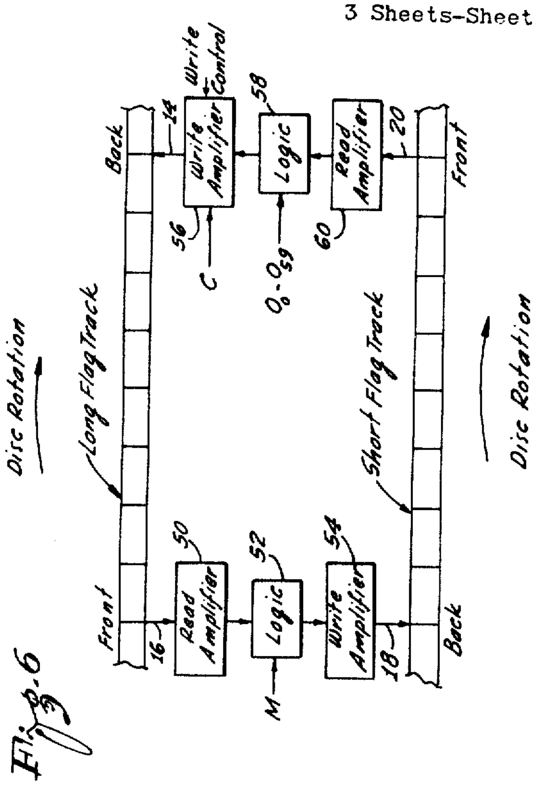
FIGURE 6 is a block representation of the circulating register and associated logic.
Figure 4:
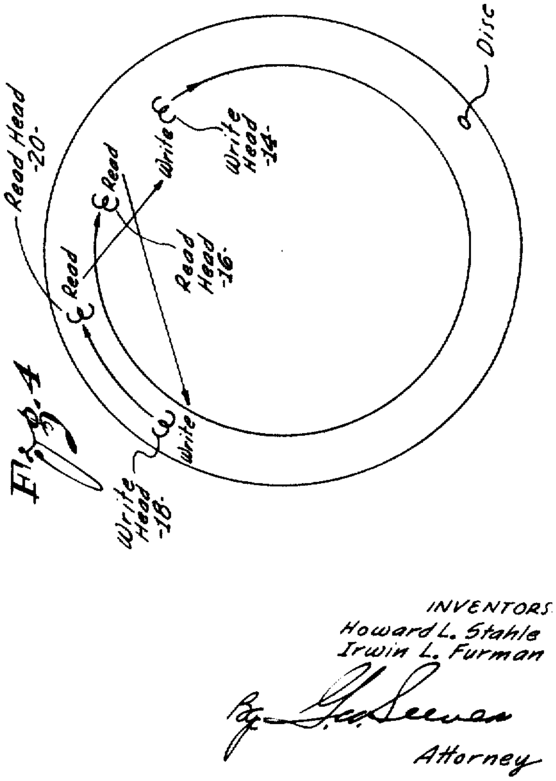
FIGURE 4 is a schematic representation of a magnetic memory disc, and of a pair of flag tracks on the disc, there forming a portion of a flag circulating register to be described.

To meet the requirements set forth in the preceding paragraph, the circulating register of FIGURES 4 and 6 is used. This register provides markers, or flags, in the flag track set of FIGURE 3. The tracks are designated flag track sets 1 and 2, and each set includes a pair of special delay line tracks, one being designated the long delay flag track, and the other being designated the short delay flag track, as mentioned above. The tracks of the flag circulating register are shown more completely in FIGURE 4.

The magnetic memory disc is designated 10 in FIGURE 4, and the various data track sets and index track sets of FIGURE 3 extend as concentric annular channels around the memory disc. The memory disc also includes the two flag track sets 1 and 2 mentioned above, and each of these track sets includes a long delay track and a short delay track. It will be appreciated that, for purposes of convenience, only one flag track set is shown in FIGURE 4.

As illustrated, the long flag track of the illustrated flag track set has an electro-magnetic write head 14 magnetically coupled to the memory disc, and it has an electro-magnetic read head 16 magnetically coupled to the memory disc. The read head 16 is displaced 296 bits, for example, in a counterclockwise direction from the write head 14. Assuming clockwise rotation of the disc 10, it is evident that any flag signals written into the long flag track by the write head 14 circulate around the entire disc, with the exception of 296 bits, before they are read by the read head 16.

The short flag track of FIGURE 4 has an electro-magnetic write head 18 magnetically coupled to the memory disc, and it has an electro-magnetic read head 20 magnetically coupled to the memory disc. The read head 20 is displaced in a clockwise direction 296 bits from the write head 18. Any flag signals written into the short flag track circulate only 296 bit positions before being read by the read head 20.

It will be appreciated that the read and write heads are any suitable type of electro-magnetic transducer. As will be described, the read head 16 is coupled to the write head 18, and the read head 20 is coupled to the write head 14. Under normal circumstances, the circuitry associated with the write head 14 is deactivated, and the flag signals circulate in the long flag track in a normal manner. However, upon the activation of the circuitry, associated with the write head 14, the flag signals read by the read head 16 are circulated through the short delay track and are subsequently read by the read head 20. This permits one or more of the selected flag signals to be changed during their circulation through the flag track and associated logic. This change may occur, for example, when the flag signals are read by the read head 16, as is the case with the "missed" M flags; or it may occur later, after they are read by the read head 20, as is the case with the "obsolete" O flags. In any event, the final form of any particular flag signal so changed, is written in the appropriate location of the long flag track by the write head 14.

Figure 5:
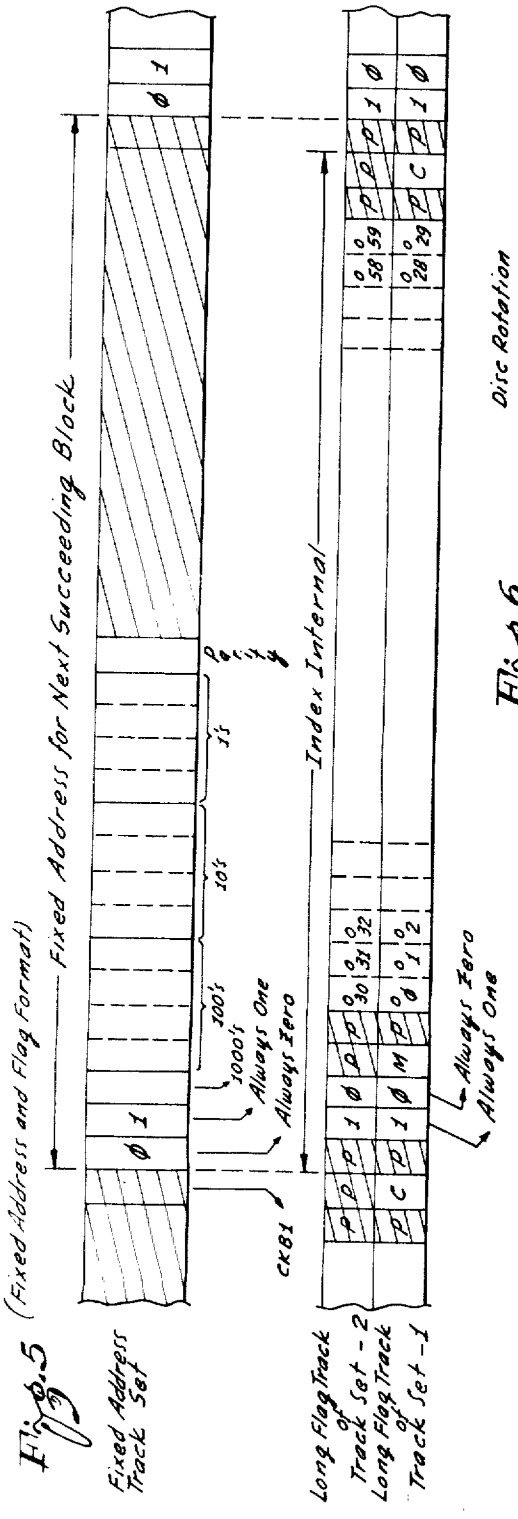
FIGURE 5 is a schematic representation of the flag data stored in the aforesaid circulating register.

The flag signals are recorded in successive blocks around the long flag track; these blocks corresponding, for example, to the successive fixed address blocks in the fixed address track set (FIGURES 3 and 5). One particular block of flag signals is shown, for example, in FIGURE 3, and as illustrated by the vertical dotted lines, this block corresponds to the index portion 0.

Each block of flag signals, as shown in FIGURE 5, for example, includes a double set of bits. The long flag tracks of the two track sets of FIGURES 3 and 5 are sensed in parallel. The flags are recorded in the two long flag tracks in, for example, 36 double bits, so as to correspond in length with the index portions, as shown in FIGURE 3.

Each block of flag signals, as shown in FIGURE 5, includes three types of flags, as mentioned above. The obsolete flags, denoted by the letters $O_0$–$O_{59}$ in FIGURE 5, are pertinent, in each instance, to the next succeeding index portion in the index track set of a particular band. The obsolete flags indicate whether or not the designated block location of the various bands have been obsoleted or purged, and are therefore available to receive new data. These obsolete flags can be written during a content search when a successful comparison is achieved, or they can be written by fixed address. The various obsolete flags are removed in each case when the respective data blocks are reloaded.

As shown in FIGURE 5, for identification purposes, the first double bit of the flag block in the two long flag tracks is always a pair of ones and the second double bit is always a pair of zeros. The double bits 5–34 hold the position-coded obsolete flags ($O_0$–$O_{29}$) and ($O_{30}$–$O_{59}$) for bands 0–29 and for bands 30–59 respectively.

The second flag type in the block of FIGURE 5 is the "missed" flag M whose function is to indicate during a key search, on the first pass on the disc, which index portions along with their respective data blocks were not key searched. This is necessary since when content agreement is made on an index portion, and the key search is switched to the pertinent data track set, as many as six index portions of other data blocks may be missed. These latter index portions are flagged as "missed," so that after the first revolution of the disc, the records marked as missed may be examined on subsequent revolutions, at which time the missed flags are removed. The missed flag M in the flag block shown in FIGURE 3, for example, actually refers to the corresponding index 0, whereas the obsolete flags refer to the subsequent index 192. The missed flag bit M in FIGURE 5 occurs at the third bit position in track 1 of the pair of tracks, as shown.

The third flag type is the "compare" flag, and it is shown by the letter C in FIGURE 5. This compare flag bit occurs at the 36th bit position in track 1. This bit refers to the subsequent index portion. In the particular flag block shown in FIGURE 3, the compare flag C refers to the block index portion 193, as do the obsolete flag bits O, whereas the missed flag bit M refers to the current index portion 0. As mentioned above, the compare flag C is used on certain instructions from the data processing equipment to keep track of the data blocks which compare fully on the key search, but which have not yet been sent to the data processing equipment. As these blocks are subsequently picked up by the data processing equipment, the corresponding compare flag C is erased. Alternatively, if a new command is executed, the old compare flags are erased.

The block of flag signals shown in FIGURE 5 includes pad, or spacer bits, at each end. These bits are designated P and they signify no relevant data. They merely represent bits which permit bit changes to be made on either side of them with no resultant interference with other information in the block. Under normal operation, the bits in the flag block are normally set to 0, and whenever the various bits are set to 1, they are intended to flag the corresponding data block locations.

For example, and as mentioned above, a missed record M is set to 1 when the corresponding data block of the data band being processed cannot be content checked because an overlapped record is being read. When such a bit is sensed on a subsequent revolution of the memory disc, the corresponding data block can be checked.

As also mentioned, when a compare flag C is set to 1, it signifies that a corresponding data block on the memory disc has met the content search criteria, but has not been transferred to the data processor, either because the processor is busy or because a "count only" instruction has been executed. In either event, when the particular compart bit C in the flag block is marked "1," the corresponding record may be retrieved without again searching for it when the associated data processing equipment is ready to receive that record.

Likewise, whenever an obsolete flag $O_0$–$O_{59}$ in the block of FIGURE 5 is set to one, it indicates that a corresponding data block location is obsolete and can receive a new data block.

In a constructed embodiment of the invention, and as mentioned previously herein, a plurality of bands, each comprising an index track set and a number of data track sets, such as shown in FIGURE 3, are provided. For any revolution of the memory disc, any particular one of the bands may be processed, as directed by the data processor. The flag track sets 1 and 2 of FIGURE 3 are used for all the bands, which are sixty in number in the constructed embodiment.

For that reason the obsolete flags O are position coded in each flag block, such as shown in FIGURE 5, so that all available memory locations in all sixty bands may be designated. There is no need to provide such coding for the missed or compare flags, as these are utilized during the processing of individual ones of the different bands, and they are erased when the processing is switched from one band to another.

As mentioned above, a corresponding obsolete bit 0 in the flag block of FIGURE 5 cannot be marked as one, so as to designate an obsolete position on the memory, until the entire block has been sensed from the memory during the content search. However, during the random write information, the fact as to whether any particular area is available for recording must be made known prior to the beginning of any particular block of data. In order to effectuate the above-mentioned requirements, the long and short flag tracks of each of the flag track sets 1 and 2 are intercoupled in the manner described above, in conjunction with FIGURE 4, and as shown in more detail in FIGURE 6.

The read head 16 is magnetically coupled to the front of the long flag track, and as shown in FIGURE 6 this read head is coupled to a read amplifier 50. The output from the output amplifier 50 is applied to an appropriate logic circuit 52, the output of which is amplified in a usual write amplifier 54. The write amplifier 54 is coupled to the write head 18 which, in turn, is magnetically coupled to the back of the short flag track.

The read head 20 is coupled to the front of the short flag track and it is displaced along the short flag track in the direction of rotation of the memory disc, as mentioned above, by an amount corresponding, for example, to eight index portions or 296 bits. The read head 20 is coupled to a read amplifier 60 which, in turn, is coupled through an appropriate logic circuit 58 to a write amplifier 56. The write amplifier 56 is coupled to the write head 14 which is magnetically coupled to the back of the long flag track.

The write head 14 is displaced from the read head 16 in the direction of disc rotation by the same amount as the displacement between the write head 18 and read head 20. It is apparent therefore, that information written into the back of the long flag track by the write head 14 circulates around the entire memory disc 10 before it is read by the read head 16. The flag bits are stored in the long track, as mentioned, and these bits circulate in the long track unchanged, until the activation of the circuitry of FIGURE 6. When that circuitry is activated, the selected bits from the long track are caused to circulate through the short track so that certain ones of the selected bits may be changed as so desired.

As mentioned above, the "missed" flag M is inserted in a particular flag block to indicate that the current index block was missed. That is, when the M bit in the flag block of FIGURE 5 is set to 1, it indicates that the current index block 0 was missed during the current processing of a particular band designated by the associated data processor.

The "miss" of the current index block 0 occurs at the precise time the read head 16 reads the flag block of FIGURE 5. In order that the miss bit M may be set to one, the logic 52 and 58 is activated to cause the particular block to circulate through the short flag line. At the time the miss bit passes through the logic 52 it is set to 1, and the missed bit M is later written from logic 58 to write head 14, without writing any other bits of the flag block.

The next time the missed flag bit of the particular block is read by the read head 16 and passed through the logic 52, it is returned to zero.

The above described processing of the M bit is not appropriate for the compare bits C or obsolete bits O. This is because the entire index block and associated data block must be read before the decision can be made to set a C bit or O bit to 1. This is because, in a content search, the search field of a desired data block need not be contained entirely in the associated index, but can also appear as any desired portion of the data block itself.

The flag block pertaining to any particular data block reaches the write head 14 at the back of the long flag track after that data block has been completely processed. If it is desired, then, to designate that block with a C or an O flag, the write amplifier 56 is activated to permit either the contents of the short flag track to circulate through the logic 58 to the write head 14, or to permit a compare control to be introduced to the write head.

The compare control serves to change the compare bit C in the particular block to a 1 when it is desired to flag the aforesaid "compare" condition. The presence of the pad bits on either side of the C bit in the block permits this operation to be carried out without interference with significant bits. That is, the write amplifier 14 may be turned on during the first pad bit time, the change may be made to the C bit during the C bit time, and the write amplifier may be turned off during the next pad bit time.

Due to the position coding of the O bits, they are disposed adjacent one another and there would be too much wastage of space to interpose pad bits between each of the O bits. Therefore, any changes to the O bits are made as the contents of the short flag track circulate through the logic 58. This permits the write amplifier to be turned on and off at predetermined bit times during which no interference with significant bits will occur; and the O bits may then be changed individually, as will be described, without interference with adjacent bits as the flag blocks circulate through the logic 58.

The compare flag bit C in any flag block is returned to O when that block is again sensed, or when the processing of the memory is switched to another band. However, the obsolete bits remain at 1 until a new block of data is actually stored in the designated memory location. Then, the corresponding flag bit is returned to zero.

As mentioned, although one index track set and six data track sets are shown in FIGURE 3, the system may include as many as sixty bands of one index track set and six data track sets, for example. When sixty bands or files are used, the afore-described position coding of the O bits is used to store all the obsolete flags required, for example, for all the 1350 blocks of data of each of the sixty bands. By recirculating the flag blocks through the short flag track and through the associated logic of FIGURE 6, it is possible to read and modify any of the flag bits related to any specific block, as mentioned, both before the index portion of that block has come under the data read/write heads, as is the case with the missed flags; or after the entire block has passed under the data read/write heads, as with the obsolete and compare.

The manner in which the obsolete flags are processed by the logic circuitry 58 will be more readily comprehended by a consideration of the more detailed logic block diagram of FIGURE 7. The block diagram of FIGURE 7 includes a decimal counter composed of a first set of flip-flops FCA1–FCA4 for the "units" decimal digits and a second pair of flip-flops FCT1 and FCT2 for the "tens" decimal digits. This counter is used to position code the obsolete bits $O_0$–$O_{59}$ of FIGURE 5. The counter is capable of being set to a selected initial count of from 0–29, and it is then caused to decrement, or count down to zero. When the counter reaches 0, a term GW0FT is set true, and the corresponding 0 bit ($O_0$–$O_{59}$) can be changed accordingly.

A flip-flop TFU30C is included to select either the flag track set 1 or flag track set 2 of FIGURE 5. When the flip-flop TFU30C is set, the flag track set 1 is selected, so that the counter (FCA–FCT) selects the "under thirty" 0 bit positions from $O_0$–$O_{29}$. On the other hand, when the flip-flop TFU30C is reset, the counter (FCA–FCT) is caused to select the "over thirty" 0 bit positions $O_{30}$–$O_{59}$ in the flag track set 2.

The representation of FIGURE 5 shows the relationship between a fixed address block in the fixed address track, and the corresponding flag block in the flag track set. The particular fixed address block designates the address of the next succeeding data block. The fixed address block may include a bit CKB1 which sets the index and flag block bit counter CKB. This counter is then caused to count bit by bit from the CKB1 bit position to a CKB37 bit position at the end of the flag block. Each address block in the fixed address track may include, for example, an initial "0" bit followed by a "1" bit. Then, the actual fixed address is established in the following 13 bit positions, followed by a parity bit.

The CKB1 bit position of each address block corresponds to the spacer bits between successive blocks of flag data, as shown in FIGURE 5. Therefore, the bit counter CKB counts from CKB2–CKB37, as it counts the bits of the flag block.

The CKB1 bit occurs five bit times before the bit time of the $O_0$ and $O_{30}$ bits, as shown in FIGURE 5. As mentioned above, the bit counter CKB is included in the logic of FIGURE 7, and this counter is set to count 1 by the CKB1 bit. The counter then counts the bit times of the index and flag blocks, as mentioned, from CKB1–CKB37 bit times.

At CKB1 bit time, the decimal counter (FCA–FCT) can be set to a particular initial configuration, as determined by the particular band being processed. Then, at CB6 bit time, the counter starts to decrement down to zero. When the counter reaches zero, the aforementioned term GW0FT is set true, so that the corresponding 0 bit may be set to a particular value.

The logic equations for the decimal counter (FCA–FCT) can be expressed as follows:

$$\text{TFU30C (set)} = \text{CKB1}.\text{GFU30C}$$
$$\text{TFU30C (reset)} = \text{CKB1}.\overline{\text{GFU30C}}$$
$$\text{GFCD} = \overline{\text{CKB1}}.\overline{\text{CKB2}}.\overline{\text{CKB3}}.\overline{\text{CKB4}}.\overline{\text{CKB5}}$$
$$\text{G3750} = \overline{\text{FCA1}}.\text{GFCD}$$
$$\text{G3751} = \text{G3750}.\overline{\text{FCA2}}$$
$$\text{G3752} = \overline{\text{FCA3}}.\overline{\text{FCA4}}$$
$$\text{FCA1 (set)} = \text{G3750} + \text{AD1}.\text{CKB1}$$
$$\text{FCA1 (reset)} = \text{FCA1}.\text{GFCD} + \overline{\text{AD1}}.\text{CKB1}$$
$$\text{FCA2 (set)} = \text{G3751}.\overline{\text{G3752}} + \text{AD2}.\text{CKB1}$$
$$\text{FCA2 (reset)} = \text{G3750}.\text{FCA2} + \overline{\text{AD2}}.\text{CKB1}$$
$$\text{FCA3 (set)} = \text{G3750}.\text{FCA4} + \text{AD3}.\text{CKB1}$$
$$\text{FCA3 (reset)} = \text{G3751}.\text{FCA3} + \overline{\text{AD3}}.\text{CKB1}$$
$$\text{FCA4 (set)} = \text{G3751}.\text{G3752} + \text{AD4}.\text{CKB1}$$
$$\text{FCA4 (reset)} = \text{G3750}.\text{FCA4} + \overline{\text{AD4}}.\text{CKB1}$$
$$\text{FCT1 (set)} = \overline{\text{FCT1}}.\text{FCT2}.\text{G3751}.\text{G3752} + (\text{GTDD1} + \text{GTDD4})\ \text{CKB1} + \text{GW0FT}$$
$$\text{FCT1 (reset)} = \text{FCT1}.\text{G3750}.\text{G3752} + (\overline{\text{GTDD1}} + \overline{\text{GTDD4}})\ \text{CKB1}$$
$$\text{FCT2 (set)} = (\text{GTDD2} + \text{GTDD5})\ \text{CKB1} + \text{GW0FT}$$
$$\text{FCT2 (reset)} = \text{FCT1}.\text{FCT2}.\text{G3751}.\text{G3752} + (\overline{\text{GTDD2}} + \overline{\text{GTDD5}})\ \text{CKB1}$$

The logic of FIGURE 7 also includes a data register which, in turn, includes flip-flops AD1–AD4, and TD1–TD3. This register is set in correspondence with the particular band being processed, so that the counter FCA–FCT can be set to an appropriate initial configuration, as described above. The data register is set by the data processor to the appropriate setting of from 0–59.

The configuration of the flip-flops TD1–TD3 of the data register represents the "tens" decimal integer, and these are coded into the terms GTDD1, GTDD2, GTDD4, GTDD5, so that the "tens" flip-flops FCT of the decimal counter FCA–FCT may be appropriately set when the TD flip-flops are either in the range of 0–2 or 3–5. It will be remembered that the counter FCA–FCT counts only 30, and that the flip-flop TFU30C selects one or the other of the flag track sets 1 and 2 so that either the O bits $O_0$–$O_{29}$, or the O bits $O_{30}$–$O_{59}$ can be processed.

The term GFU30C is used to set the flip-flop TFU30C if the register designates a decimal number under 30, and this term can be expressed $$GFU30C=\overline{TD3}.\overline{TD1}+\overline{TD3}.\overline{TD2}$$

When the decimal counter (FCA–FCT) is counted down to zero, as mentioned above, the term GW0FT is set true. This can be expressed as:

$$GW0FT=G3751.G3752.\overline{FCT1}.\overline{FCT2}$$

Therefore, by means of the logic described above, an appropriate timing control is established so that when a particular obsolete bit $O_0$–$O_{59}$ is to be processed, the gate circuitry is enabled at the proper time, as determined by the particular band being processed.

The aforementioned gate circuitry is designated G2FW1 and G2FW2 in FIGURE 7. The gate circuit G2FW1 is associated, for example, with a write head 14*a* at the back of the long flag track of track set 1 (0 bits over 30); and the gate circuit G2FW2 is associated with a write head 14*b* at the back of the long flag track of track set 2 (0 bits under 30).

The gates G2FW1 and G2FW2 are "and" gates, and they are enabled by the flip-flop TFU30C. That is, when the flip-flop TFU30C is in its set state, the "and" gate G2FW2 is enabled so that the "under-30" O bits may be written. Alternately, when the flip-flop TFU30C is reset, the "and" gate G2FW1 is enabled so that the "over-30" O bits may be written.

The O bits are position coded by the GW0FT term, as described above. Also, the "and" gates G2FW1 and G2FW2 are enabled when the flip-flop TW0FLG is set. This flip-flop is set by the term GE0BR which is true when a successful compare has been achieved. The flip-flop TW0FLG, therefore, is set at an appropriate time prior to the particular flag block when a successful compare is achieved, and the flip-flop is reset at the end of the flag block. The flip-flop TW0FLG, therefore, sets the interval when an obsolete flag may be written.

When the conditions described above have been fulfilled, so that one or the other of the "and" gates G2FW1 is enabled at a particular bit time, a clock pulse may be passed through the enabled "and" gate to set the corresponding O bit to 1. Appropriate logic circuitry is provided to return the O bit to zero when a subsequent block of data is written into the absoleted memory location.

Likewise, a suitable and straightforward logic circuitry is provided so that the missed and compare bits may be written into the flag block at the designated bit positions in FIGURE 5, and upon the occurence of the corresponding events.

The invention provides, therefore, a mass memory system which may be of the content addressable type, and which is constructed to provide a simple, improved and unique means for flagging, or otherwise designating certain conditions in the memory system, as described above.

While a particular embodiment of the invention has been described, modifications may be made. It is intended in the following claims to cover all modifications which fall within the scope of the invention.

What is claimed is:

1. In a memory system which includes storage means for the storage of blocks of data at different memory locations therein for the selection of such blocks by a data processor, the combination of: circulating register means including a first portion for storing flag signals designating the availability of such memory locations for the storage of data blocks and having an input point and an output point, and including a second portion having an input point and an output point; control circuitry coupling said output point of said first portion to said input point of said second portion and said output point of said second portion to said input point of said first portion selectively to cause said flag signals to circulate from said first portion through said second portion and back to said first portion; and logic circuitry coupled to said control circuitry for selectively activating said control circuitry so as to control the composition of predetermined ones of said flag signals circulated to said first portion through said second portion as corresponding blocks are selected by the data processor so as to indicate the availability of the corresponding memory locations for the storage of blocks of data.

2. In a memory system which includes movable storage means for the storage of blocks of data at different memory locations therein for the selection of such blocks by a data processor, the combination of: circulating register means having a timing synchronized with said storage means and including a first portion for storing flag signals designating the availability of such memory locations for the sotrage of data blocks and having an input point and an output point and exhibiting a relatively long time delay between such input and output points to flag signals introduced to said input point, and further including a second portion having an input point and an output point and exhibiting a relatively short time delay between such input and output points to flag signals introduced to said last named input point; control circuitry coupling said output point of said first portion to said input point of said second portion and said output point of said second portion to said input point of said first portion so as to cause said flag signals to circulate from said first portion through said second portion and back to said first portion; and logic circuitry coupled to said control circuitry for selectively activating said control circuitry so as to control the composition of predetermined ones of said such flag signals circulated to said first portion through said second portion as corresponding blocks are selected by the data processor so as to indicate the availability of the corresponding memory locations for the storage of blocks of data.

3. In a memory system which includes a movable storage member for the storage of blocks of data in at least one first track therein and at different memory locations along said first track for the selection of such blocks by a data processor, the combination of: circulating register means including a pair of further tracks on said movable storage member, the first of said pair of further tracks serving to store flag signals designating the availability of such memory locations along said first track for the storage of data blocks and having an input point and an output point and exhibiting a relatively long time delay between such input and output points to flag signals introduced to said input point, and the second of said pair of further tracks having an input point and an output point and exhibiting a relatively short time delay between such input and output points to flag signals introduced to said last-named input point; control circuitry including transducer means coupling said output point of said first further track to said input point of said second further track and said output point of said second further track to said input point of said first further track to cause said flag signals to circulate from said first further track through said second further track and back to said first further track; and logic circuitry coupled to said control circuitry for selectively activating said control circuitry so as to control the composition of predetermined ones of such flag signals circulated to said first further track through said second further track as corresponding blocks are selected by the data processor so as to indicate the availability of the corresponding memory locations for the storage of blocks of data.

4. The combination set forth in claim 3 in which said movable storage member is in the form of a plurality of rotatable magnetic memory discs, and said transducer means include electromagnetic write heads magnetically coupled to one of said discs and disposed at respective ones of said input points, and electromagnetic read heads magnetically coupled to said one of said discs and disposed at respective ones of said output points.

5. The memory system defined in claim 4 in which said logic circuitry includes counter means for position coding said flag signals circulated to said first further track from said second further track so as to indicate the availability of memory locations on respective ones of said discs.

6. The memory system defined in claim 5 in which said logic circuitry includes a register for receiving signals designating predetermined addresses, and in which said logic circuitry further includes counter means coupled to said last-named register for position coding said flag signals circulated to said first further track from said second further track and in accordance with the address signals in said register.

7. In a memory system which includes a movable storage member for the storage of blocks of data in at least one first track therein and at different memory locations along said first track for the selection of such blocks by a data processor, the combination of: circulating register means including a pair of further tracks on said movable storage member, the first of said pair of further tracks serving to store flag signals designating the availability of such memory locations along said first track for the storage of data blocks and having an input point and an output point and exhibiting a relatively long time delay between said input and output points to flag signals introduced to said input point, and the second of said pair of further tracks having an input point and an output point and exhibiting a relatively short time delay between such input and output points to flag signals introduced to said last named input point; first circuit means including transducer means coupling said output point of said first further track to said input point of said second further track to cause said flag signals to circulate from said first further track through said second further track; second circuit means including transducer means coupling said output point of said second further track to said input point of said first further track to cause said flag signals to circulate from said second further track back to said first further track; and logic circuitry coupled to said second circuit means for selectively activating said second circuit means so as to control the composition of predetermined ones of said flag signals circulated to said first further track from said second further track as corresponding blocks are selected by the data processor so as to indicate the availability of the corresponding memory locations for the storage of blocks of data.

References Cited

UNITED STATES PATENTS

| | | | |
|---|---|---|---|
| 2,680,239 | 6/1954 | Daniels et al. | 340—174 |
| 2,770,797 | 11/1956 | Hamilton et al. | 340—174 |
| 2,874,371 | 2/1959 | Foster | 340—174 |
| 2,974,867 | 3/1961 | Steele | 235—167 |
| 2,978,680 | 4/1961 | Schulte | 340—172.5 |
| 3,024,993 | 3/1962 | Wright et al. | 235—176 |
| 3,056,110 | 9/1962 | Cypeser et al. | 340—172.5 |
| 3,116,410 | 12/1963 | La Manna et al. | 235—157 |

ROBERT C. BAILEY, *Primary Examiner.*

P. J. HENON, R. RICKERT, *Assistant Examiners.*